T. LENNOX.
SPRINKLER HEAD.
APPLICATION FILED MAY 25, 1904.
920,592.
Patented May 4, 1909.
2 SHEETS—SHEET 1.
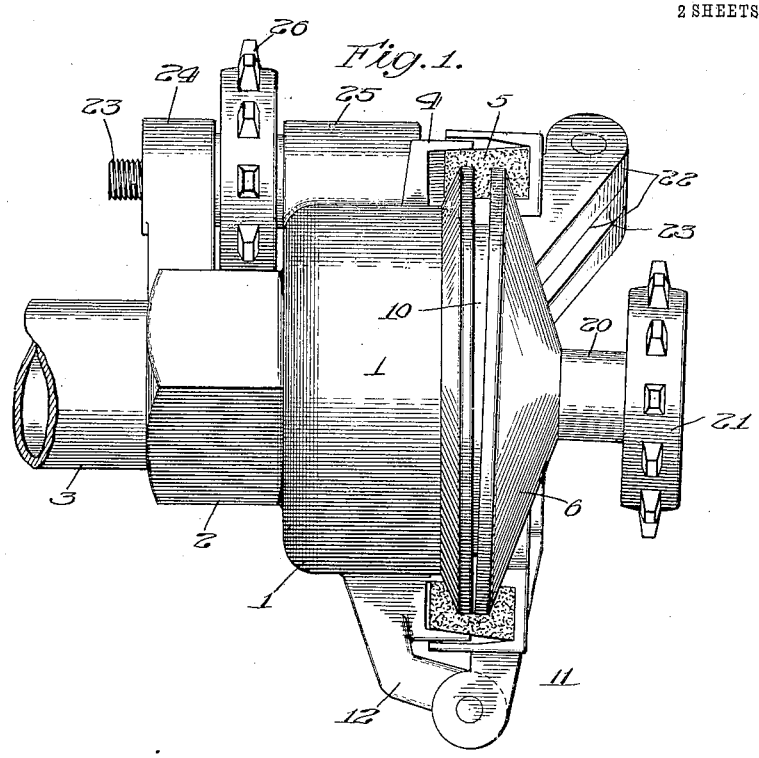
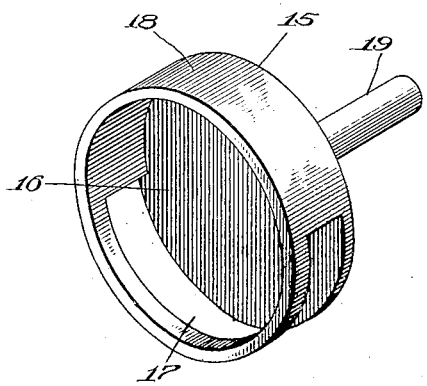
Witnesses:
Inventor:
Talbot Lennox
By: Jones & Addington
Attorneys

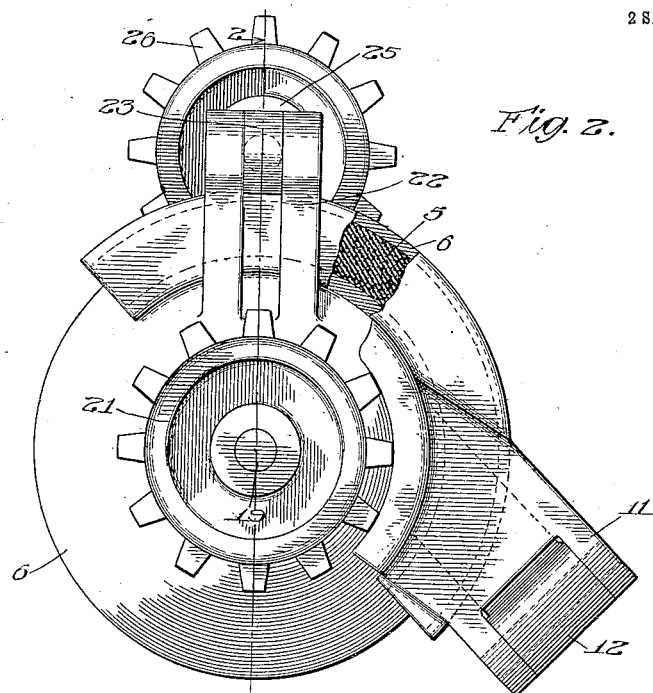
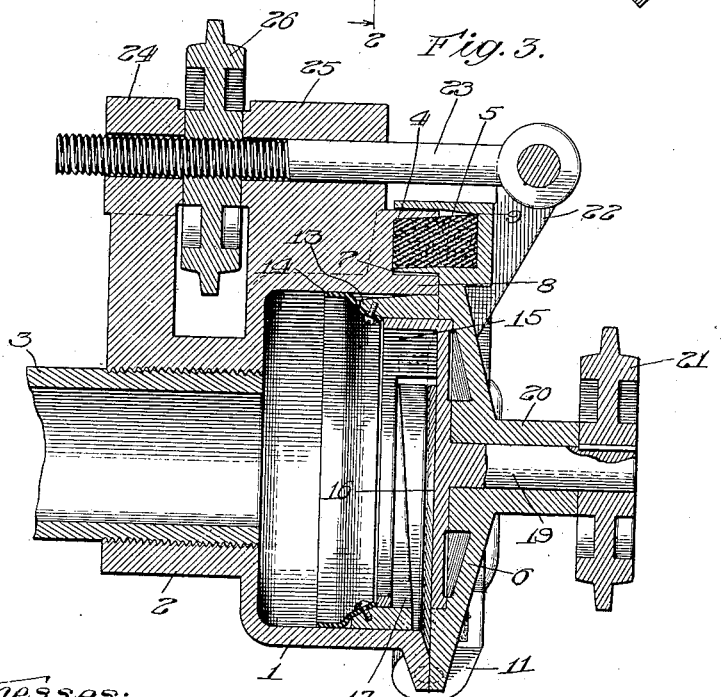

UNITED STATES PATENT OFFICE.

TALBOT LENNOX, OF CHICAGO, ILLINOIS, ASSIGNOR TO McGUIRE, CUMMINGS MANUFACTURING COMPANY, OF CHICAGO, ILLINOIS, A CORPORATION OF ILLINOIS.

SPRINKLER-HEAD.

No. 920,592.     Specification of Letters Patent.     Patented May 4, 1909.

Application filed May 25, 1904. Serial No. 209,804.

*To all whom it may concern:*

Be it known that I, TALBOT LENNOX, a citizen of the United States, residing at Chicago, in the county of Cook and State of Illinois, have invented new and useful Improvements in Sprinkler-Heads, of which the following is a full, clear, concise, and exact description, reference being had to the accompanying drawing, forming a part of this specification.

My invention relates to sprinkler heads for sprinkling carts or cars.

It has for its object to provide means whereby the water may be thrown at a great distance on either side of the cart without causing the water to flow with such force as to tear up the ground.

The present method of sprinkling the streets on either side of railroad tracks has serious objections in that if the water is sprayed with sufficient force to cause it to reach to either curb of the street, the water near the tracks will be delivered in such a volume and with such force as to tear up the gravel and seriously affect the road bed of the tracks. This is due to the fact that no means have been provided for varying the spray, in order that a small spray of water may be thrown near the tracks and a larger spray with greater force may be thrown to extend to the curb.

By my present invention, I am enabled to regulate the spray to such a degree that the spray near the track will be comparatively small, while that which is intended to reach to the curb will be larger.

One device for accomplishing my object is shown in the accompanying drawings, in which—

Figure 1 is a front elevation of the sprinkler head; Fig. 2 is a side elevation thereof; Fig. 3 is a sectional view, taken on the line 2—2 of Fig. 2; and, Fig. 4 is a detail view of the means for cutting off the water supply in the sprinkler head.

As shown in the accompanying drawings, I provide a cup-shaped casing or head 1, having the rearward extension 2 into which is adapted to be screwed or otherwise connected a pipe or hose 3 leading from the water supply. Formed around one-half of the periphery of the head or casing is a groove 4 adapted to receive a rubber or resilient packing 5. A cover 6 for said head or casing is provided with a groove 7 extending half-way around the same, in which is adapted to fit the outer end 8 of the casing, and a second groove 9 is formed on said cover, also extending half-way around the same, which coöperates with the groove 4 in forming a channel for the reception of the rubber gasket 5. By this arrangement a slot or opening 10, as shown in Fig. 1, is formed, which extends only half-way around the sprinkler head, causing a flat spray of water to issue from one side only thereof. Projecting from the lower portion of the cover 6 is one portion 11 of a hinge, which, when connected with the other portion 12, forms a hinge joint between the casing or head 1 and its cover 6. By hinging the cover 6 to the head, as shown, the slot or opening formed by opening the cover will assume a V-shape, as shown in Fig. 1, and a spray will be formed, which is larger at one point as it issues from the sprinkler than at another. The inner wall 13 of the groove 7 has secured thereto a washer 14, which prevents the water from working out between the casing and the wall 13.

For controlling the amount of water which issues from the slot or opening 10, a valve 15 is provided. The valve 15 comprises a cup-shaped head 16, which is adapted to fit within the cover 6, as shown in Fig. 2. The side wall of said head is provided with a slot 17, which will register with the slot 10 and permit the water to flow, but when the valve is turned until the portion 18 is in front of the opening, 10, the water will be effectually cut off. Also it will be noted that by turning the valve 15, the water may be delivered to predetermined points as, for instance, by cutting off the delivery of the water from the lower end of the slot, the water will be only delivered to the curb and by cutting off the water at the upper end of the slot in the sprinkler head, the water will be delivered near the tracks and will not be delivered to the curb. A stem 19 of said valve is suitably journaled in a bearing 20, formed in the head 6, and upon the outer end of said stem is keyed a sprocket wheel 21 for turning the valve to open or close the opening 10. For controlling the size of the spray, two upwardly extending arms 22 are formed upon the upper portion of the head 6, between which is pivoted a bolt 23. The bolt 23 extends across the head or casing and is journaled in the bearings 24 formed on the casing 1. A sprocket wheel 26 is screwed upon the bolt 23 and is mounted between the bearings 24 and 25, whereby, as the wheel is turned, the bolt will be moved laterally one way or the other, thereby opening and closing the slot as desired. I preferably mount four of these sprinkler heads upon a sprinkling car and said heads are arranged with the slot 10 at an angle of forty-five degrees, as shown in Fig. 1. By this arrangement, it will be seen that the upper part of the spray will describe a parabolic curve and thus have a maximum range and strike the ground substantially normal without much damage by washing or sweeping effects. The water will thus be thrown into the center of the track and over to the curb, thereby sprinkling the entire street. The graduated slot is so arranged that from the smaller end the water for the tracks is adapted to flow and from the larger ends the spray or water for the street is adapted to flow, which effectually prevents the delivery of a larger volume of water from flowing with great force immediately upon the ground and thereby prevent the washing out of the track bed.

It will be seen that by my invention I am enabled to provide a spraying opening in the sprinkler head, which is comparatively small at one point and gradually increases in size, thereby throwing a graduated spray, which will sprinkle a large area of ground without throwing the water in such a volume near the car or cart as to tear up the roadway.

While I have shown and described one means for accomplishing the various objects of my invention, it will be understood that I do not wish to limit myself to this particular construction, as there are various changes which may be made without departing from the spirit of my invention, the principal feature of which is to deliver a spray of water which is substantially V-shaped in cross section.

Having thus described my invention what I claim as new and desire to secure by Letters Patent is:

1. A sprinkler-head having a discharge opening therein, whereby a spray V-shaped in cross-section will be thrown, means for varying the size of said opening without varying the shape thereof, and a cut-off mounted within said head whereby the opening may be shortened longitudinally as desired.

2. A sprinkler-head having a discharge opening therein, whereby a spray V-shaped in cross-section will be thrown, means for varying the transverse size of said opening without varying the shape thereof, and means disposed within said head for varying the longitudinal size of said opening by shortening said opening at either end as desired.

3. A sprinkler-head having a discharge opening whereby a spray V-shaped in cross-section will be thrown, means for varying the transverse size of said opening without varying the shape thereof, and means independent of said first means disposed within said head for controlling the flow of water from said opening.

4. In a sprinkling apparatus, the combination of a hollow head connected with the water supply, a cover for said head and secured thereto so as to form a discharge opening whereby a spray V-shaped in cross-section will be thrown, means for varying the transverse size of said opening, and means independent of said first means disposed within said head for controlling the amount of water discharged from said opening.

5. A sprinkler head having a substantially V-shaped opening therein, whereby a spray of water V-shaped in cross-section will be delivered, means for varying the size of said opening without varying the shape thereof, rotary means within said head for varying said opening to deliver the water to a predetermined point, said means being provided with an axially-disposed stem extending outside of said head, and means on said stem for revolving the same.

6. In a sprinkling apparatus, the combination of a hollow head connected with the water supply, a cover for said head and secured thereto so as to form a discharge opening wider at the top than at the bottom, means for varying the size of said opening, a semicircular gasket arranged between the edges of said cover and head to prevent the escape of water through one-half of said opening, and means independent of said first means disposed within said head for controlling the amount of water discharged from said opening.

7. In a sprinkling apparatus, the combination of a hollow head, a cover for said head arranged to form between the edges of said cover and head a discharge-opening; means for adjusting the cover relatively with the head for varying the width of said opening; a rotatable valve located within said cover but operable independently thereof for controlling the discharge of water from said opening; means for operating said valve; and means for preventing the escape of water through said opening except through a predetermined part of said opening.

8. In a sprinkling apparatus, the combination with a hollow head, of a cover hinged thereto and adapted to be opened farther at the top than at the bottom thereof to form an opening through which a spray substantially V-shaped in cross-section is delivered, means for preventing the escape of water except from one side of said opening, and means within the head for controlling the flow of water through said opening, said means comprising a rotatable cup formed with a slot in its side-wall to register with said opening.

9. In a sprinkling apparatus, the combination with a hollow head, of a cover hinged thereto and adapted to be opened wider at the top than at the bottom thereof to form an opening through which a spray substantially V-shaped in cross-section is delivered, means for preventing the escape of water except from one side of said opening, means for moving said cover to vary the size of said opening, and means for controlling the flow of water therethrough, said means comprising a member within the head adapted to rotate axially with relation to said head and to act as a cut-off at either end of said opening as desired.

10. In a device of the character described, the combination with a hollow head connected with the water supply, of a cover for said head arranged to be opened wider at the top thereof than at the bottom to form a longitudinally extending V-shaped slot between said cover and head, a cut-off valve arranged within said head and having the stem thereof extending through said cover, and means carried upon the outer end of said stem for operating said cut-off valve.

11. In a device of the character described, the combination with a hollow head connected with the water supply, of a cover for said head arranged to be opened wider at the top thereof than at the bottom to form a longitudinally extending V-shaped slot between said cover and said head, a transversely arranged screw hinged to said cover, and a nut arranged upon said screw between stops, for adjusting the size of the opening between said cover and head.

12. In a device of the character described, the combination with a hollow head connected with the water supply, of a cover for said head arranged to be opened wider at the top thereof than at the bottom to form a longitudinally extending V-shaped slot between said cover and said head, a transversely arranged screw between stops for adjusting the size of the opening between said cover and head, a cut-off valve arranged within said head and having the stem thereof extending through said cover, and means carried upon the outer end of said stem for operating said cut-off valve.

13. In a sprinkling apparatus, the combination of a hollow head; a cover for said head and arranged to form between the edges of said cover and head a substantially V-shaped discharge-opening; means for adjusting the transverse size of said opening; a rotatable valve arranged within but operable independently of said cover and having its stem extending therethrough; means carried by said stem for operating said valve; and a compressible member, arranged between said cover and head, for preventing the escape of water therebetween except through said opening.

14. In a sprinkling apparatus, the combination of a hollow head; a cover for said head arranged to form between the edges of said cover and head a substantially V-shaped opening; a screw secured to said cover for adjusting the transverse size of said opening; means for operating said screw; a cut-off valve arranged within, and adapted to rotate axially with relation to, said cover; means for operating said valve; and a semi-circular gasket arranged between the edges of the cover and head to prevent the escape of water therebetween except through said opening.

15. In a device of the character described, the combination with a hollow head connected with the water supply, of a cover for said head arranged to be opened wider at the top thereof than at the bottom to form a longitudinally extending V-shaped slot between said cover and said head, a transversely arranged screw between stops for adjusting the size of the opening between said cover and head, a cut-off valve arranged within said head and having the stem thereof extending through said cover, means carried upon the outer end of said stem for operating said cut-off valve, and a compressible member arranged between said cover and head for preventing the escape of water therebetween except through said opening.

In witness whereof, I have hereunto subscribed my name in the presence of two witnesses.

TALBOT LENNOX.

Witnesses:
C. B. SLAGLE,
J. FUGLESTAD.